US007970938B1

United States Patent
Lambeth et al.

(10) Patent No.: US 7,970,938 B1
(45) Date of Patent: Jun. 28, 2011

(54) IP SUBNET DISCOVERY WITH RANKED RESULTS

(75) Inventors: Walter Andrew Lambeth, San Meteo, CA (US); Jyothir Ramanan, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 574 days.

(21) Appl. No.: 11/505,600

(22) Filed: Aug. 16, 2006

(51) Int. Cl.
*G06F 15/173* (2006.01)

(52) U.S. Cl. ........ 709/245; 709/224; 709/206; 709/241; 707/7; 726/15

(58) Field of Classification Search .................. 709/224, 709/245
See application file for complete search history.

(56) References Cited

U.S. PATENT DOCUMENTS

| | | | | |
|---|---|---|---|---|
| 5,751,967 | A * | 5/1998 | Raab et al. ................ | 709/228 |
| 6,826,611 | B1 * | 11/2004 | Arndt ....................... | 709/226 |
| 7,089,293 | B2 * | 8/2006 | Grosner et al. ............ | 709/217 |
| 7,243,075 | B1 * | 7/2007 | Shaffer et al. ............. | 705/10 |
| 7,293,106 | B2 * | 11/2007 | Natarajan et al. .......... | 709/238 |
| 7,350,077 | B2 * | 3/2008 | Meier et al. ............... | 713/171 |
| 7,360,086 | B1 * | 4/2008 | Tsuchiya et al. ........... | 713/168 |
| 7,441,045 | B2 * | 10/2008 | Skene et al. ............... | 709/241 |
| 7,472,192 | B2 * | 12/2008 | DeFerranti et al. ......... | 709/226 |
| 7,499,940 | B1 * | 3/2009 | Gibbs ....................... | 1/1 |
| 7,606,939 | B1 * | 10/2009 | Finn ......................... | 709/246 |
| 2002/0004735 | A1 * | 1/2002 | Gross ....................... | 705/10 |
| 2002/0009090 | A1 * | 1/2002 | Kalkunte et al. .......... | 370/401 |
| 2002/0016858 | A1 * | 2/2002 | Sawada et al. ............ | 709/238 |
| 2003/0097438 | A1 * | 5/2003 | Bearden et al. ........... | 709/224 |
| 2003/0112808 | A1 * | 6/2003 | Solomon .................. | 370/400 |
| 2005/0060312 | A1 * | 3/2005 | Curtiss et al. ............. | 707/7 |
| 2005/0188080 | A1 * | 8/2005 | Motsinger et al. ......... | 709/224 |
| 2006/0059238 | A1 * | 3/2006 | Slater et al. .............. | 709/206 |
| 2006/0143703 | A1 * | 6/2006 | Hopen et al. ............. | 726/15 |
| 2007/0067282 | A1 * | 3/2007 | Prakash et al. ............ | 707/5 |
| 2008/0002736 | A1 * | 1/2008 | Droux et al. .............. | 370/463 |

* cited by examiner

*Primary Examiner* — Krista M. Zele
*Assistant Examiner* — O. C. Vostal

(57) ABSTRACT

An embodiment of the present invention is directed to a method of determining a probable IP subnet of a network. The method includes maintaining a table of possible networks. The entries of the table include respective network addresses, respective subnet masks, and respective scores. The method also includes observing a packet, determining an IP address of the packet, and comparing the IP address of the packet with the respective network addresses of the entries of the table of possible networks. If the IP address of the packet falls under the respective network address of a particular entry, the respective score of the particular entry is adjusted. Otherwise, a new entry is created in the table of possible networks corresponding to the IP address of the packet. The method also includes ranking the entries of the table of possible networks based on their respective scores.

44 Claims, 10 Drawing Sheets

IP SUBNET DISCOVERY WITH RANKED RESULTS

BACKGROUND

1. Field

Embodiments of the present invention relate to the field of computer network configurations.

2. Background

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

Virtualized Computer Systems

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100 of computer system 700, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU 210, virtual memory 230, at least one virtual disk 240, and one or more virtual devices 270. Note that a disk—virtual or physical—is also a "device," but is usually considered separately because of the important role of the disk. All of the virtual hardware components of the VM 200 may be implemented in software using known techniques to emulate the corresponding physical components. The guest system software 202 includes a guest operating system (OS) 220 and drivers 224 as needed for the various virtual devices 270.

Note that a single VM 200 may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors $210_0$-$210_m$ (VCPU0, VCPU1, . . . , VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc.

If the VM 200 is properly designed, applications 260 running on the VM 200 will function as they would if run on a "real" computer, even though the applications are running at least partially indirectly, that is via the guest OS 220 and virtual processor(s) 210. Executable files will be accessed by the guest OS 220 from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs) 300, "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself.

Moreover, FIG. 1 shows virtual machine monitors 300 that appear as separate entities from other components of the virtualization software. Furthermore, some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210, the virtual memory 230, the virtual disk 240, and the virtual device(s) 270, are shown as being part of the VM 200 for the sake of conceptual simplicity. In actuality, these "components" are usually implemented as software emulations 330 included in the VMM 300. One advantage of such an arrangement is that the VMM 300 may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software. FIG. 1 shows a console operating system (COS) 420 and a set of applications (APPS) 430.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

Subnets and Network Masks

Subnetting an IP network allows a single large network to be broken down into what appears (logically) to be several smaller ones. It was originally introduced before the introduction of classful network numbers in IPv4, to allow a single site to have a number of local area networks. Even after the introduction of classful network numbers, subnetting continues to be useful, as it reduces the number of entries in the Internet-wide routing table (by hiding information about all the individual subnets inside a site). As a side benefit, it also results in reduced network overhead by dividing the parts which receive IP broadcasts.

A network mask, also known as a subnet mask, netmask, or address mask, is a bitmask used to tell how many bits in an octet(s) identify the subnet, and how many bits provide room for host addresses. Subnet masks are usually represented in the same representation used for addresses themselves—in IPv4, dotted decimal notation, four numbers from zero to 255 separated by periods, e.g. 255.128.0.0. Less commonly, the subnet mask can be represented as an eight-digit hexadecimal number (e.g. FF.80.00.00=255.128.0.0). A shorter form, which is known as Classless Inter-Domain Routing (CIDR) notation, gives the network number followed by a slash ("/") and the number of 'one' bits in the binary notation of the netmask (i.e. the number of relevant bits in the network number). For example, 192.0.2.96/28 indicates an IP address where the first 28 bits are used as the network address (same as 255.255.255.240).

IPv4 addresses are broken down into three parts: the network part, the subnet part (now often considered part of the network part), and the host part. There are three classes (A, B, and C) of IP address which determine how much is which, as shown below in Table 1.

TABLE 1

| | | IP Network Classes | | | |
|---|---|---|---|---|---|
| Class | First bits | Start | End | Default Subnet Mask in dotted decimal | CIDR notation |
| A | 0 | 1.0.0.0 | 126.0.0.0 | 255.0.0.0 | /8 |
| B | 10 | 128.0.0.0 | 191.255.0.0 | 255.255.0.0 | /16 |
| C | 110 | 192.0.0.0 | 223.255.255.0 | 255.255.255.0 | /24 |

Subnetting is the process of allocating bits from the host portion as a network portion. For example, giving the class A network 10.0.0.0 a subnet mask of 255.255.0.0 would break it down into 256 sub-networks (10.0.0.0 to 10.255.0.0). Indicating that the first octet of the IP address shows the network address, the second one shows the subnet number and the last two show the host part. A bitwise AND operation of the host address with the subnet mask extracts the complete subnet address (see example below). Subnet masks are not limited to whole octets either. For example, 255.254.0.0 (or /15) is also a valid mask. Applied to a class A address this would create 128 subnets in intervals of two (1.2.0.1-1.3.255.254, 1.4.0.1-1.5.255.254, etc).

Consider the following detailed example. Having the IP address 12.11.10.9, with a subnet mask of 255.254.0.0 (the same as 12.11.10.9/15) indicates: (1) that the host address is 12.11.10.9 (decimal)=> 00001100.00001011.00001010.00001001 (binary); (2) that the most significant bit is zero and therefore the network is a class 'A' network with the network address 12.0.0.0; and (3) that the subnet mask is 255.254.0.0 (decimal)=> 11111111.11111110.00000000.00000000 (binary). The subnet mask extends the network address by 7 more bits (254). Thus the subnet number is 10 and the extended network address is 12.10.0.0 (decimal)= 00001100.00001010.00000000.00000000 (binary) (bitwise AND of 12.11.10.9 with 255.254.0.0). The remaining host part is 0.1.10.9 (decimal)=> 00000000.00000001.00001010.00001001 (binary).

Determining the number of hosts and subnets on a particular network is quite simple, if the subnet mask is known. Take, for example, the network address 154.4.32.0 with a subnet mask of 255.255.224.0. This network address can also be written as 154.4.32.0/19. Thus, the network address 154.4.32.0 (decimal)=> 10011010.00000100.00100000.00000000 (binary) and the subnet mask 255.255.224.0 (decimal)=> 11111111.11111111.11100000.00000000 (binary). The subnet mask has 19 bits for the network portion of the address, and 13 bits for the host part. Therefore, there are $2^{13}=8192$ possible addresses in the subnet, with one being the subnet address itself, and a second being the subnet's broadcast address, for a total of 8190 possible hosts in the subnet.

Computer programs are becoming network-based with an increasing frequency. Such programs generally require both proper network configuration and connection to a proper network in order to function correctly. Having one and not the other may result in program errors. Therefore, when diagnosing an error, it would be helpful if the system running the program could somehow sense the network to which is connected.

Furthermore, server systems often have several network interface cards (NICs) connected to several different networks. In such cases, the labeling of the actual physical network cables is relied upon heavily to ensure that each NIC is connected to the proper network. In the event of a network related error, a system administrator would check that a NIC is connected to the proper network by first physically looking at the wiring. If the server visually appears to be properly connected, the administrator may then determine whether or not the wiring is in fact mislabeled by pinging one of a known list of candidates on the desired network. If no response to the ping request is received, the system administrator may then try plugging a different network cable into the NIC and then repeating the process of pinging a known host. Unfortunately, this process can become extremely tedious and time-consuming. Once again, when diagnosing this error, it would be helpful if the server could somehow sense the network to which it is connected.

These issues described above can also arise within the context of virtual machines. For example, in a computer system running one or more virtual machines, each virtual machine may have a virtual NIC, and the computer system's virtualization layer may implement a "virtual switch" between the various virtual machines in order to share one or more network connections via one or more physical NICs. Thus, even though the computer system sees a finite number of network connections due to the finite number of physical NICs, the number of virtual network configurations within the computer system may be infinite. Therefore, just as with traditional computing systems, virtual machines operating within a single computing system that rely on a network connection may also rely on the fact that they are in fact connected to the proper network, virtual or physical. As such, in the event of a network error, it would be helpful if the virtual machines could sense the networks to which they are connected, especially if the system administrator does not have access to the virtualization layer's user interface.

SUMMARY

An embodiment of the present invention is directed to a method of determining a probable IP subnet of a network. The method includes maintaining a table of possible networks. The entries of the table include respective network addresses, respective subnet masks, and respective scores. The method also includes observing a packet, determining an IP address of the packet, and comparing the IP address of the packet with the respective network addresses of the entries of the table of possible networks. If the IP address of the packet falls under the respective network address of a particular entry, the respective score of the particular entry is adjusted. Otherwise, a new entry is created in the table of possible networks corresponding to the IP address of the packet. The method also includes ranking the entries of the table of possible networks based on their respective scores.

Thus, embodiments of the present invention provide a means for determining a probable IP subnet of a network. By providing a ranked set of results, embodiments are able to hedge against the possibility that one or more rogue or misconfigured hosts are connected to the network. When using embodiments of the present invention, if a computing device connected to a network experiences a network error, a system administrator would know with a degree of certainty whether or not the computing device is connected to the proper network, saving the system administrator considerable time and aggravation.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
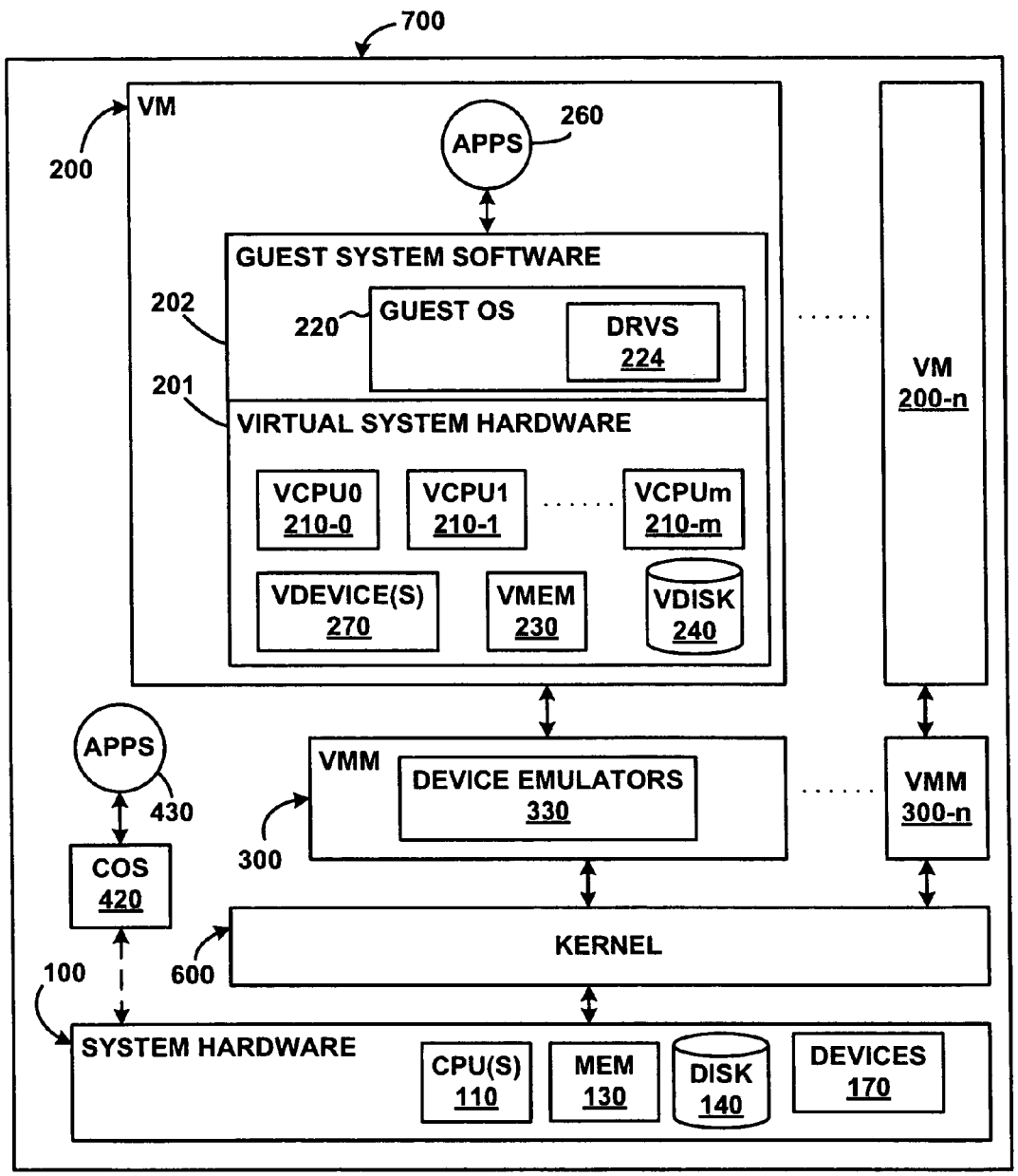
FIG. 1 shows one possible arrangement of a computer system that implements virtualization.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

As an overview, embodiments of the present invention are directed towards methods and systems for IP subnet discovery. One way of determining the subnet of a network is to start off with the smallest possible subnet mask and assign a subnet address based on the first IP address observed. Then for each new IP address observed on the segment, the size of the mask can be increased so that the new address would be included in the current subnet. One serious flaw in this approach is that it operates under the assumption that all hosts on the segment are properly configured and therefore is very vulnerable to being skewed greatly by one or more misconfigured machines on the LAN segment. If machines which do not belong on a subnet transmit frames with IP addresses from a different subnet, the observed subnet mask will become wider than the correct result, and from that point on will never converge on the actual subnet mask, since the algorithm only ever widens the result, never narrowing.

Thus, embodiments of the present invention maintain a ranked set of possible results, rather than simply expanding a single possible subnet to include all observed traffic. For example, in one method of determining a probable IP subnet of a network, a table of possible networks is maintained. Packets are observed and the IP addresses of the packets are determined. The IP addresses of the packets are then compared to network addresses contained as entries in the table of possible networks. If a packet IP address falls under the network address of a particular entry of the table, the score for that entry is adjusted. If no match is found for a particular packet, a new entry is created in the table of possible networks. The entries are then ranked based on their respective scores, with the top-ranked entry representing the likely subnet.

The following discussion will begin with a description of an exemplary computer system and then proceed to the description of an exemplary IP subnet discovery system. This discussion will then be followed by a description of various methods of operation of the present invention. Although specific examples are given, it is appreciated that embodiments of the present invention can be used to advantage in both virtualized and non-virtualized computer systems. It is further appreciated that embodiments implemented on virtualized computer systems can be used to advantage in both hosted and non-hosted VMs, in partially virtualized systems, and in VMs with any number of physical and/or logical virtualized processors.

Figure 2:
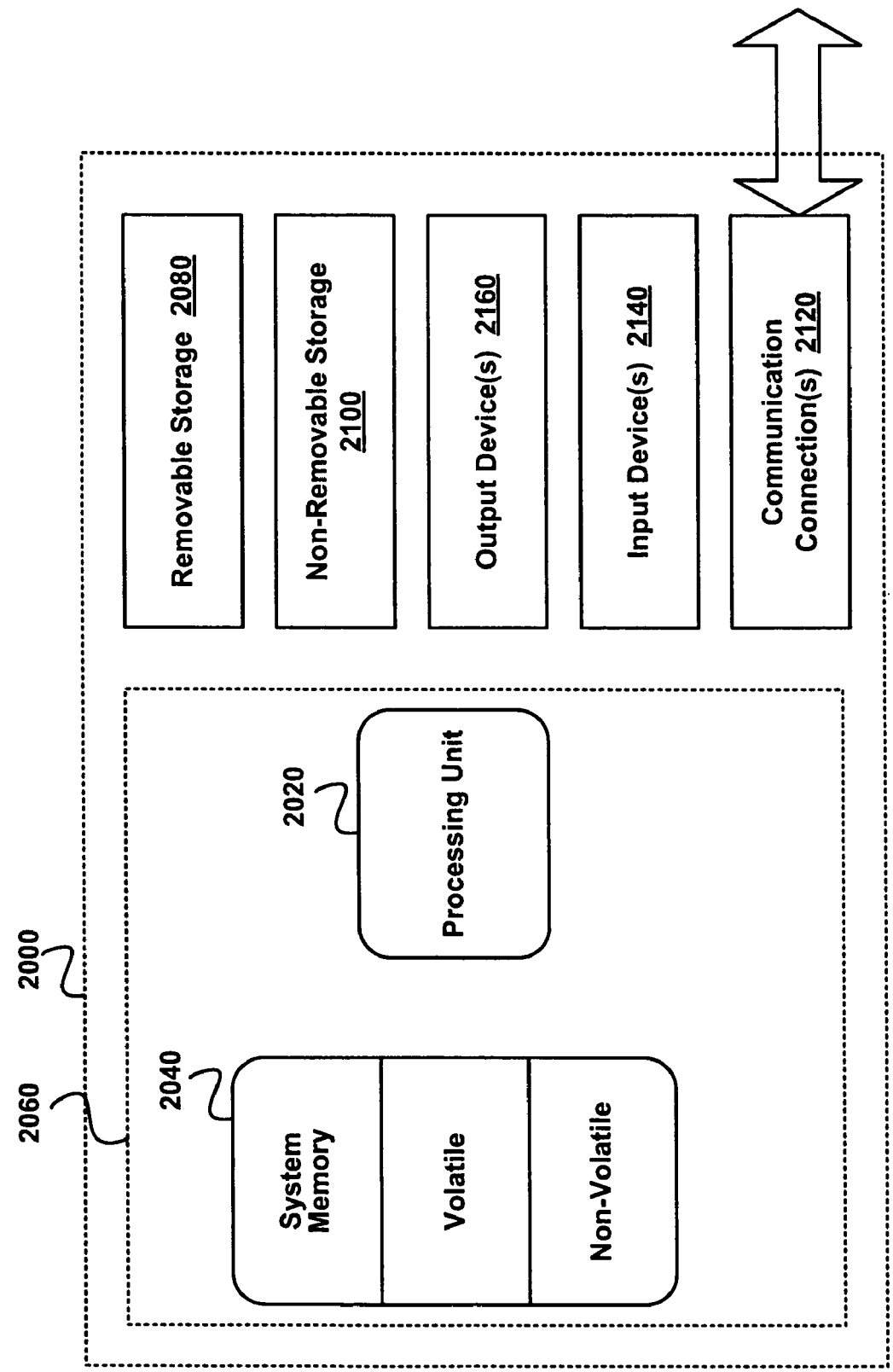
FIG. 2 is a diagram of an exemplary computer system environment with which embodiments of the present invention may be practiced.

With reference to FIG. 2, an exemplary system for implementing embodiments includes a general purpose computing system environment, such as computing system environment 2000. In its most basic configuration, computing system environment 2000 typically includes at least one processing unit 2020 and memory 2040. Depending on the exact configuration and type of computing system environment, memory 2040 may be volatile (such as RAM), non-volatile (such as ROM, flash memory, etc.) or some combination of the two. This most basic configuration is illustrated in FIG. 2 by dashed line 2060. Additionally, computing system environment 2000 may also have additional features/functionality. For example, computing system environment 2000 may also include additional storage (removable and/or non-removable) including, but not limited to, magnetic or optical disks or tape.

Such additional storage is illustrated in FIG. 2 by removable storage 2080 and non-removable storage 2100. Computer storage media includes volatile and nonvolatile, removable and non-removable media implemented in any method or technology for storage of information such as computer readable instructions, data structures, program modules or other data. Memory 2040, removable storage 2080 and nonremovable storage 2100 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 2000. Any such computer storage media may be part of computing system environment 2000.

Computing system environment 2000 may also contain communications connection(s) 2120 including, but not limited to, one or more NICs, that allow it to communicate with other devices. Communications connection(s) 2120 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 2000 may also have input device(s) 2140 such as a keyboard, mouse, pen, voice input device, touch input device, etc. Output device(s) 2160 such as a display, speakers, printer, etc. may also be included. All these devices are well known in the art and need not be discussed at length here.

Figure 3:
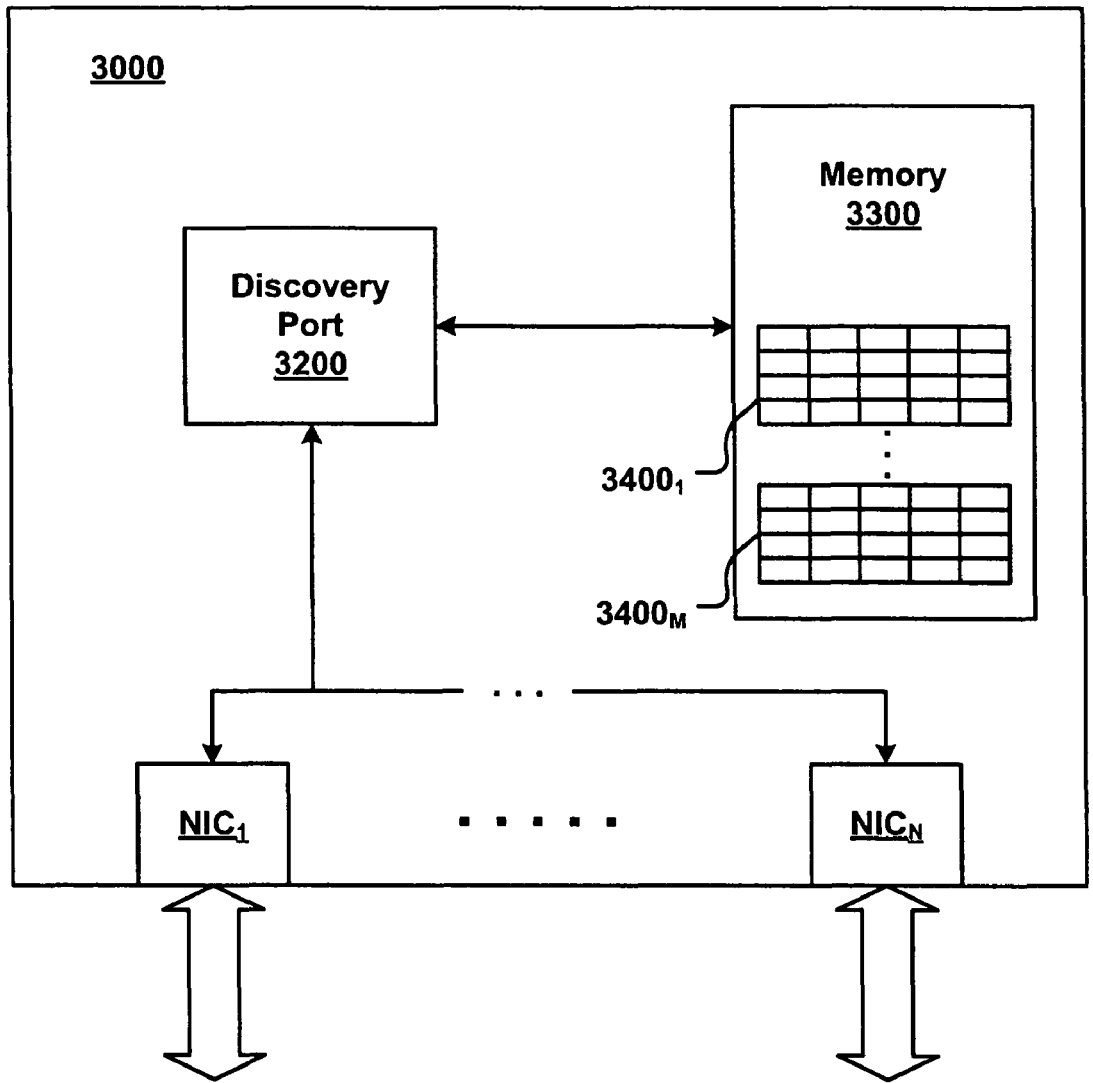
FIG. 3 illustrates a system for determining a probable IP subnet on a network, in accordance with an embodiment of the present invention.

FIG. 3 illustrates a system 3000 for determining a probable IP subnet on a network, in accordance with an embodiment of the present invention. System 3000 includes one or more network interfaces $NIC_1$-$NIC_N$ for sending and receiving a packet. System 3000 also includes a discovery port 3200 communicatively coupled with the network interfaces $NIC_1$-$NIC_N$. Generally speaking, discovery port 3200 is configurable to observe a packet and determine the IP address of the packet. System 3000 also includes a memory 3300 communicatively coupled with the discovery port 3200. The memory 3300 is configurable to store one or more tables of possible networks $3400_1$-$3400_M$. In one embodiment, the entries of the tables 3400 correspond to potential network configurations based on observed packets. The entries may include, but are not limited to, respective network addresses, respective subnet masks, and respective scores. The respective score of an entry serves as a counter for the number of packets that have been observed that would fall under the network address of the entry. The higher an entry score, the more likely it is that the entry represents the actual configuration of the network.

Discovery port 3200 is configurable to compare the IP address of the packet with the respective network addresses of the entries of the table of possible networks 3400 and determine whether the IP address of the packet falls under the network address of a particular entry. For example, the IP address 192.168.1.225 falls under the network address 192.168.1.0, with a subnet mask of 255.255.255.0. It is appreciated that this determination may be achieved in many ways. For example, in one embodiment, the IP address of the packet (e.g., 192.168.1.225) is masked with the subnet mask of the entry (e.g., 255.255.255.0) and then compared to the network address of the entry (e.g., 192.168.1.0). If the discovery port 3200 determines that the IP address of the packet falls under the respective network address of the particular entry, the discovery port 3200 will increment the respective score of the particular entry. If the discovery port 3200 determines that the IP address of the packet does not fall under the respective network addresses of the entries of the table of possible networks, the discovery port 3200 creates a new entry in the table of possible networks 3400 corresponding to the IP address of the packet.

In creating a new entry in the table of possible networks 3400, the discovery port 3200 first checks whether the new entry will be the first entry in the table 3400. If the new entry will be the first entry, it is desirable to make the new entry as narrow as possible. Accordingly, the discovery port 3200 sets the respective subnet mask of the new entry to 255.255.255.255, or an equivalent, and sets the respective network address of the new entry equal to the IP address of the packet. On the other hand, if the new entry will not be the first entry in the table 3400, it is desirable to expand the scope of the top-ranked entry in order to accommodate the IP address of the packet. In such a case, discovery port 3200 creates a new entry that comprises the top-ranked entry expanded to accommodate the IP address of the packet. In either case, the discovery port 3200 sets the respective score of the new entry to 1.

In one embodiment, in order to create a new entry in the table of possible networks 3400 that comprises the top-ranked entry expanded to accommodate the IP address of the observed packet, the discovery port 3200 first determines which bits are different between the network address of the top-ranked entry and the IP address of the packet, masked by the subnet mask of the top-ranking entry. In one embodiment, this determination is made by performing an XOR operation on the two values. For example, if the observed packet has an IP address of 192.168.2.20 (binary 11000000.10101000.00000010.00010100) and the top-ranked entry has a network address of 192.168.1.0 (binary 11000000.10101000.00000001.00000000) and a subnet mask of 255.255.255.0, the IP address of the packet masked by the subnet mask of the top-ranked entry would be 192.168.2.0 (binary 11000000.10101000.00000010.00000000). An XOR of the two values yields the result 0.0.3.0 (binary 00000000.00000000.00000011.00000000), indicating that bits 0 and 1 of the third octet are different. The discovery port 3200 then determines a subnet mask for the new entry such that the differing bits will be ignored. In one embodiment, this is achieved by performing an AND operation between the subnet mask of the top-ranked entry and the complement of the number representing the differing bits. Referring again to the above example, the subnet mask of the new entry would therefore become 255.255.252.0 (binary 11111111.11111111.11111100.00000000), which is effectively the subnet mask of the top-ranked entry widened by two bits. The discovery port 3200 then sets the network address of the new entry equal to the IP address of the packet masked by the subnet mask of the new entry (e.g., 192.168.0.0 in the above example).

After the discovery port 3200 is finished observing the packet and updating the table of possible networks 3400, the discovery port 3200 will then sort the entries of the table of possible networks by score. The resultant list is effectively a ranking of the possible networks observed thus far. In one embodiment, at any time after system 3000 has started observing packets, the discovery port 3200 may generate a report comprising a probable subnet. It is appreciated that the report may be generated in a number of ways. For example, the report may be generated as a printed hard copy via a printer (not shown), as a file stored on a storage device (not shown), as a graphical display on a display device (not shown), or the like. Furthermore, in one embodiment, the content of the report may consist solely of the top-ranked entry. In another embodiment, the report may contain several of the top-ranked entries.

Embodiments are also capable of addressing virtual LAN (VLAN) segmentation. If multiple VLANs are present on a common physical segment, then multiple IP subnets will have equal validity. In one embodiment, separate tables of possible networks are maintained for each observed VLAN. Accordingly, in one embodiment, discovery port 3200 is configurable to detect the VLAN of an observed packet and load the corresponding table. If a table does not already exist for the VLAN, the discovery port 3200 will cause one to be created in the memory 3300. Moreover, the tables may also correspond to a respective source port, which the discovery port 3200 is configurable to detect.

Up until now, the discussion of system 3000 has only been concerned with the passive observation of network traffic. However, it is appreciated that system 3000 may take an active role in obtaining packets for observation. For example, in one embodiment, the discovery port 3200 may be configurable to check for a DHCP server on the network via the network interfaces $NIC_1$-$NIC_N$ and, if one is present, obtain network information from the DHCP server via the network. In another embodiment, the discovery port 3200 may be configurable to solicit hosts on the network for packets via the network interfaces $NIC_1$-$NIC_N$. In yet another embodiment, the discovery port 3200 may be configurable to query other servers on the LAN segment that also implement a system similar to system 3000. Thus, embodiments are capable of converging on the probable subnet of a network, even if the network is a relatively low-traffic network. Moreover, once sufficient data has been obtained, active steps may also be taken to verify that the top-ranked entry is the correct result. For example, in one embodiment, the discovery port 3200 is configurable to transmit an echo request via network interfaces $NIC_1$-$NIC_N$ to the broadcast address of the top-ranked entry. Receiving several replies confirms that the top-ranked entry is likely the correct result, whereas receiving no replies indicates that the correct result has not yet been converged upon.

Figure 4:
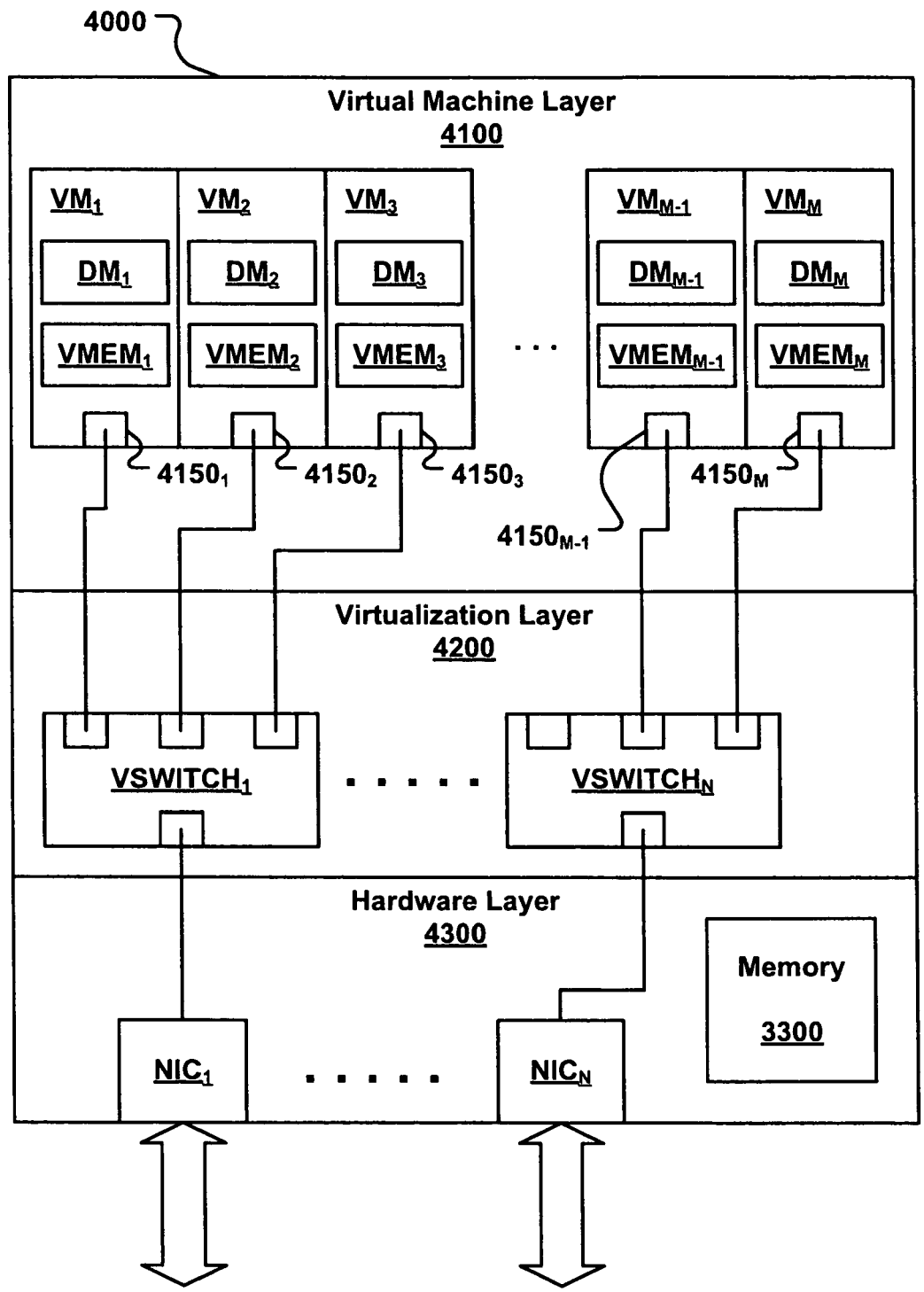
FIG. 4 illustrates a computer system for determining a probable IP subnet for a network, in accordance with an embodiment of the present invention.

FIG. 4 illustrates a computer system 4000 for determining a probable IP subnet for a first network, in accordance with an embodiment of the present invention. In some ways, computer system 4000 operates in a similar manner to system 3000. However, it should be appreciated by one skilled in the art that computer system 4000 also comprises several virtualized components.

Computer system 4000 includes a Virtual Machine layer 4100, a virtualization layer 4200, and a hardware layer 4300. Virtualization layer 4200 essentially provides an interface between the hardware layer 4300 and the Virtual Machine layer 4100. Hardware layer 4300 includes one or more network interface cards (NICs) $NIC_1$-$NIC_N$ and a memory 3300. A first NIC (e.g., $NIC_1$) is coupled with the first network.

The Virtual Machine layer 4100 includes one or more Virtual Machines $VM_1$-$VM_M$. The Virtual Machines include virtual NICs $4150_1$-$4150_M$ for sending and receiving packets. The Virtual Machines also include virtual memories $VMEM_1$-$VMEM_M$ for storing tables of possible networks. The entries of the tables of possible networks may include, but are not limited to respective network addresses, respective subnet masks, and respective scores. The virtual machines $VM_1$-$VM_M$ also include discovery modules $DM_1$-$DM_M$. The discovery module DM observes a packet received via the virtual NIC 4150 and determines its IP address.

Discovery module DM is configurable to compare the IP address of the packet with the respective network addresses of the entries of the table of possible networks and determine whether the IP address of the packet falls under the network address of a particular entry. It is appreciated that this determination may be achieved in many ways. For example, in one embodiment, the IP address of the packet is masked with the subnet mask of the entry and then compared to the network address of the entry. If the discovery module DM determines that the IP address of the packet falls under the respective network address of the particular entry, the discovery module DM will increment the respective score of the particular entry. If the discovery module DM determines that the IP address of the packet does not fall under the respective network addresses of the entries of the table of possible networks, the discovery module DM creates a new entry in the table of possible networks corresponding to the IP address of the packet.

In creating a new entry in the table of possible networks, the discovery module DM first checks whether the new entry will be the first entry in the table. If the new entry will be the first entry, it is desirable to make the new entry as narrow as possible. Accordingly, the discovery module DM sets the respective subnet mask of the new entry to 255.255.255.255, or an equivalent, and sets the respective network address of the new entry equal to the IP address of the packet. On the other hand, if the new entry will not be the first entry in the table, it is desirable to expand the scope of the top-ranked entry in order to accommodate the IP address of the packet. In such a case, the discovery module DM creates a new entry that comprises the top-ranked entry expanded to accommodate the IP address of the packet. In either case, the discovery module DM sets the respective score of the new entry to 1.

In one embodiment, in order to create a new entry in the table of possible networks that comprises the top-ranked entry expanded to accommodate the IP address of the observed packet, the discovery module DM first determines which bits are different between the network address of the top-ranked entry and the IP address of the packet masked by the subnet mask of the top-ranked entry. In one embodiment, this determination is made by performing an XOR operation on the two values. The discovery module DM then determines a subnet mask for the new entry such that the differing bits will be ignored. In one embodiment, this is achieved by performing an AND operation between the subnet mask of the top-ranked entry and the complement of the number representing the differing bits. The discovery module DM then sets the network address of the new entry equal to the IP address of the packet masked by the subnet mask of the new entry.

After the discovery module DM is finished observing the packet and updating the table of possible networks, the discovery module DM will then sort the entries of the table of possible networks by score. The resultant list is effectively a ranking of the possible networks observed thus far. In one embodiment, at any time after computer system 4000 has started observing packets, the discovery module DM may generate a report comprising a probable subnet. It is appreciated that the report may be generated in a number of ways. For example, the report may be generated as a printed hard copy via a printer (not shown), as a file stored on a respective virtual storage device (not shown), as a graphical display on a display device (not shown), or the like. Furthermore, in one embodiment, the content of the report may consist solely of the top-ranked entry. In another embodiment, the report may contain several of the top-ranked entries.

Embodiments are also capable of addressing virtual LAN (VLAN) segmentation. If multiple VLANs are present on a common physical segment, then multiple IP subnets will have equal validity. In one embodiment, separate tables of possible networks are maintained for each observed VLAN. Accordingly, in one embodiment, discovery module DM is configurable to detect the VLAN of an observed packet and load the corresponding table. If a table does not already exist for the VLAN, the discovery module DM will cause one to be created in the virtual memory VMEM. Moreover, the tables may also correspond to a respective source port, which the discovery module DM is configurable to detect.

Up until now, the discussion of computer system 4000 has only been concerned with the passive observation of network traffic. However, it is appreciated that computer system 4000 may take an active role in obtaining packets for observation. For example, in one embodiment, the discovery module DM may be configurable to check for a DHCP server on the network via the virtual NIC 4150 and, if one is present, obtain network information from the DHCP server via the network. In another embodiment, the discovery module DM may be configurable to solicit hosts on the network for packets via the virtual NIC 4150. In yet another embodiment, the discovery module DM may be configurable to query other Virtual Machines (both internal and external to system 4000) on the LAN segment that also implement a similar system. Thus, embodiments are capable of converging on the probable subnet of a network, even if the network is a relatively low-traffic network. Moreover, once sufficient data has been obtained, active steps may also be taken to verify that the top-ranked entry is the correct result. For example, in one embodiment, the discovery module DM is configurable to transmit an echo request via virtual NIC 4150 to the broadcast address of the top-ranked entry. Receiving several replies confirms that the top-ranked entry is likely the correct result, whereas receiving no replies indicates that the correct result has not yet been converged upon.

In one embodiment, because computer system 4000 may include more than one Virtual Machine, the virtualization layer 4200 may include a virtual switch (e.g., VSWITCH$_1$) communicatively coupled with a number of virtual NICs (e.g., 4150$_1$-4150$_3$) and a first NIC (e.g., NIC$_1$). The virtual switch (e.g., VSWITCH$_1$) serves to switch the "virtual network traffic" between the virtual NICs (e.g., 4150$_1$-4150$_3$) and the physical NIC.

Figure 5:
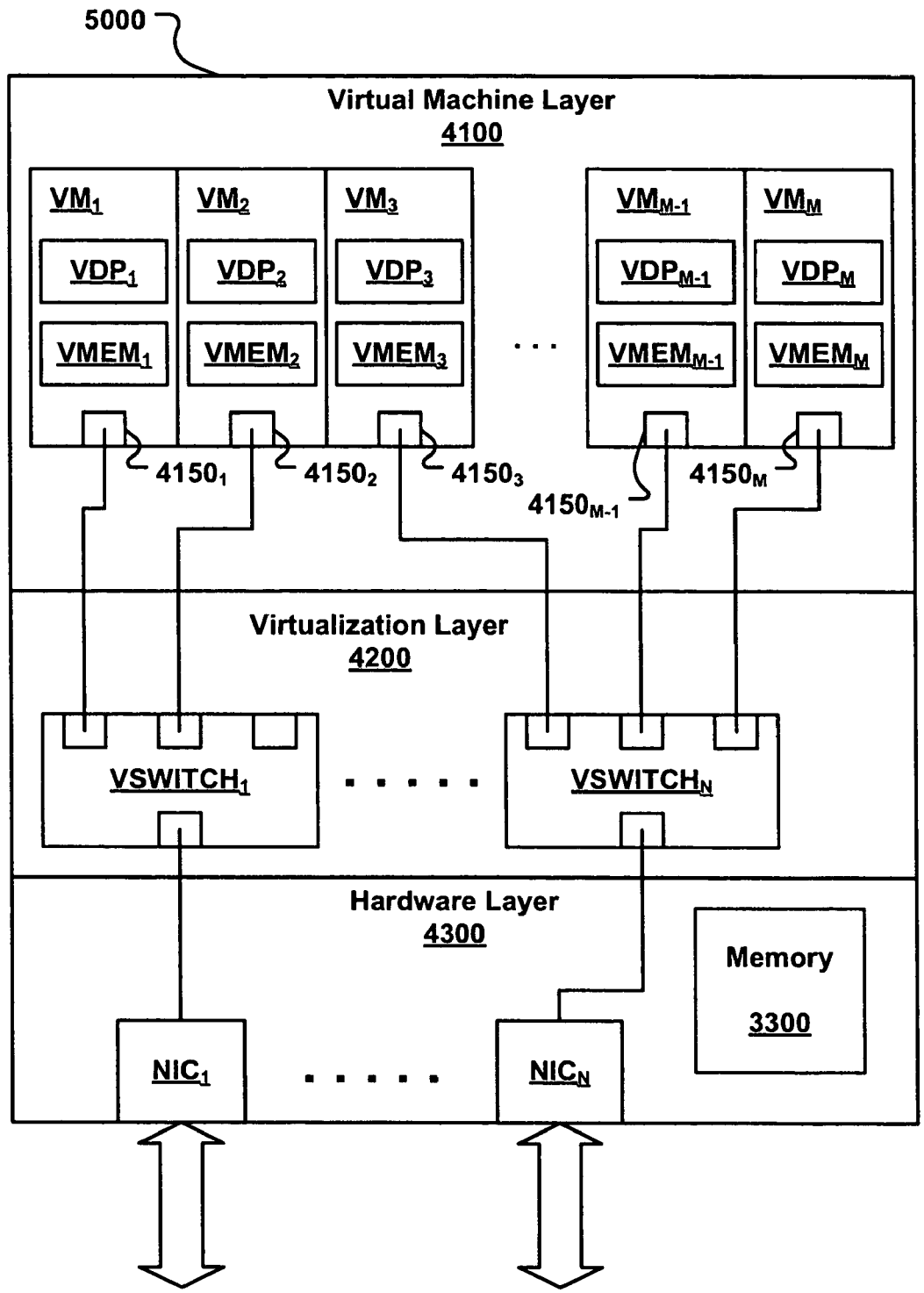
FIG. 5 illustrates an alternate configuration of a computer system for determining a probable IP subnet for a network, in accordance with an embodiment of the present invention.

The same way that a traditional computing system may be connected to an incorrect network in a traditional network environment, it is also possible for a virtual machine to be connected to an incorrect network. Consider the following example. Assume that Virtual Machine VM$_3$ is coupled to a first network via virtual NIC 4150$_3$, virtual switch VSWITCH$_1$, and NIC$_1$, as shown in FIG. 4. However, Virtual Machine VM$_3$ has a network assignment stating that it should be connected to a different network. After observing a number of packets, the top-ranked entry in the table of possible networks of Virtual Machine VM$_3$ does not correspond to its network assignment. In one embodiment, Virtual Machine VM$_3$ would be configurable to cause virtual NIC 4150$_3$ to become communicatively coupled with a second virtual switch (e.g., VSWITCH$_N$), which is coupled with a second network. This new configuration is depicted in FIG. 5 as system 5000. Note in FIG. 5 that virtual NIC 4150$_3$ of Virtual Machine VM$_3$ is now coupled with virtual switch VSWITCH$_N$, which is coupled with NIC$_N$, which is coupled with a second network. Thus, embodiments of the present invention allow a Virtual Machine to dynamically "reconnect" itself to a new network if it discovers that it is connected to an incorrect network.

Figure 6A:
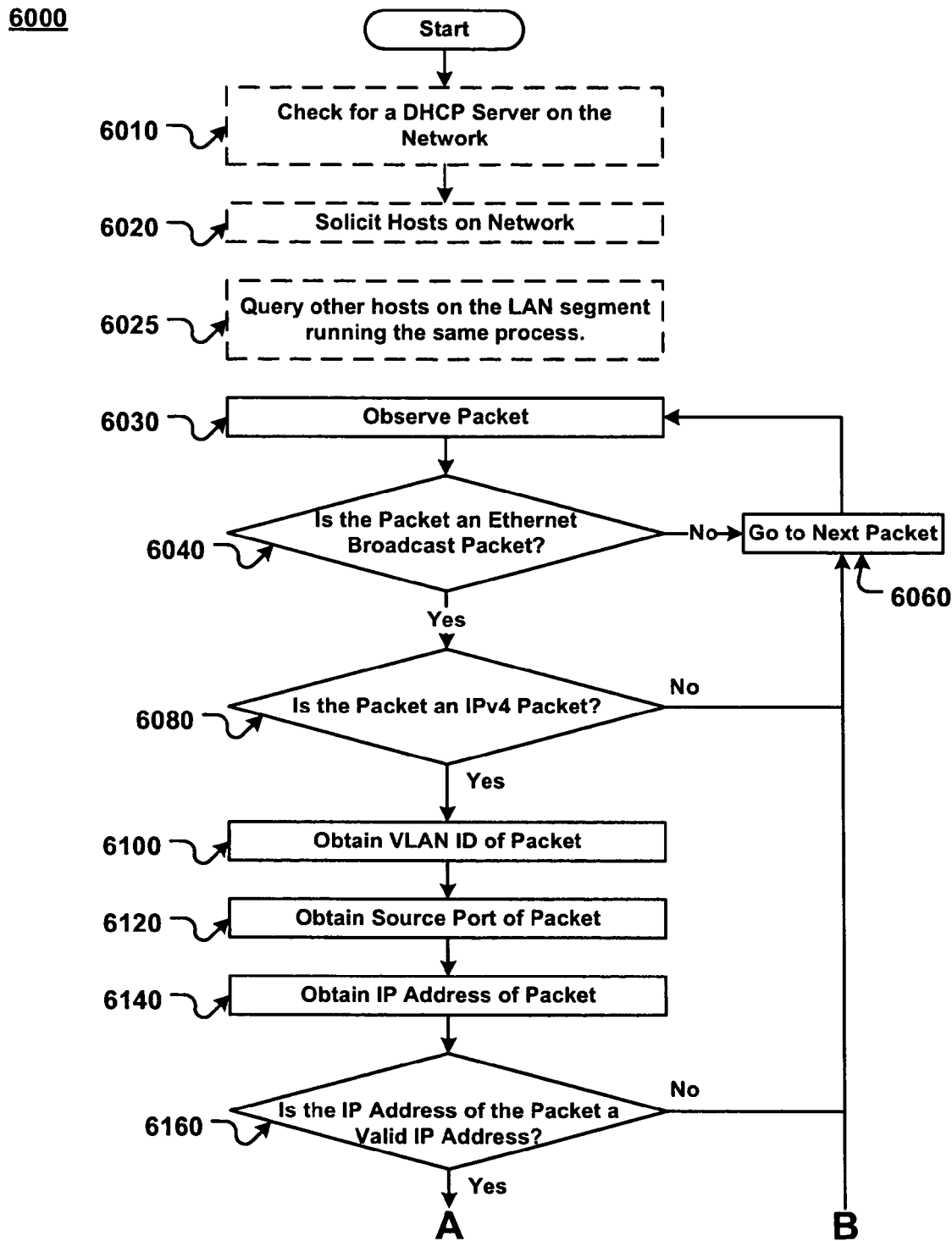
FIGS. 6A-6C show a flowchart of a process of determining a probable IP subnet on a network, in accordance with an embodiment of the present invention.
Figure 6B:
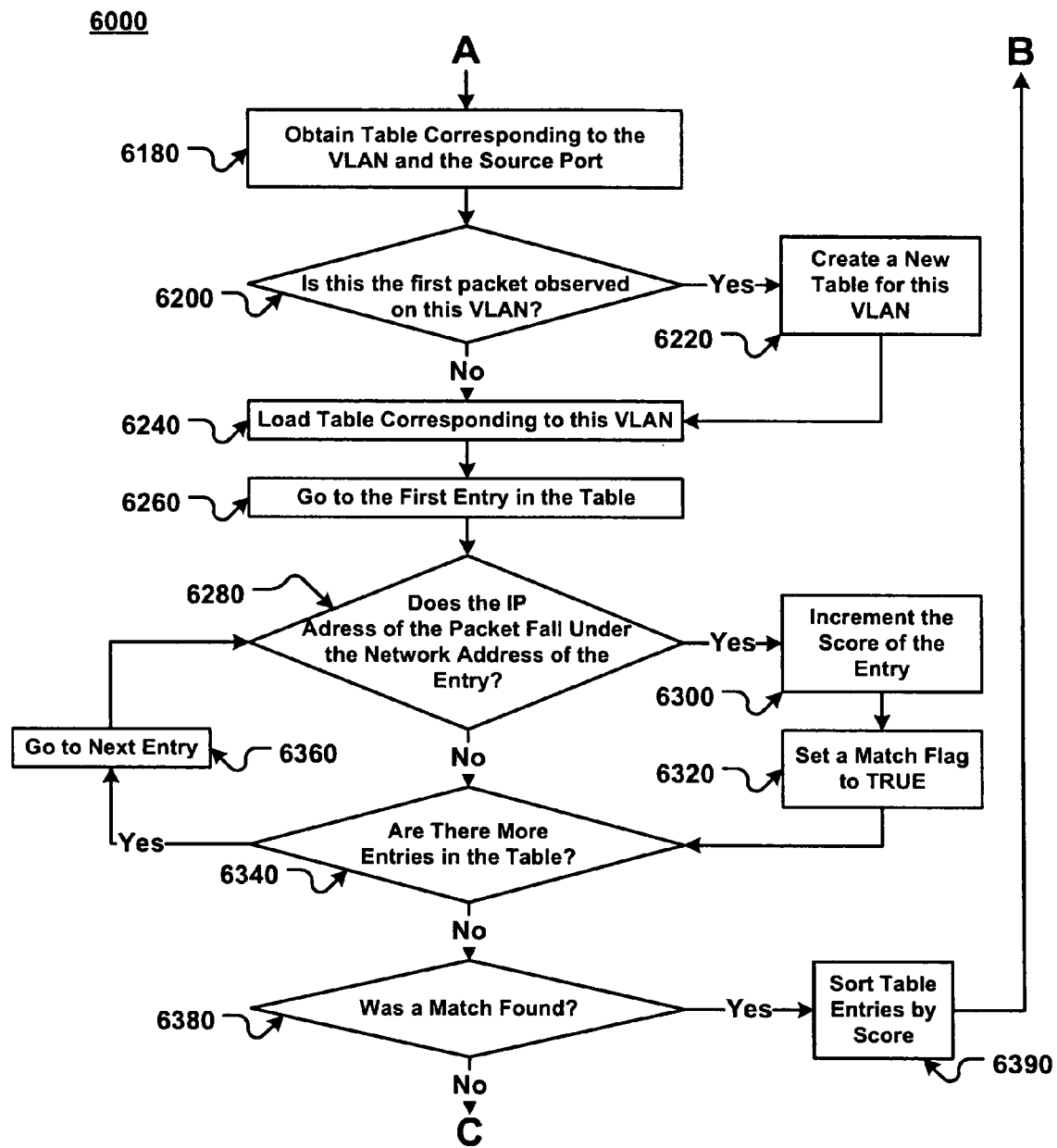
Figure 6C:
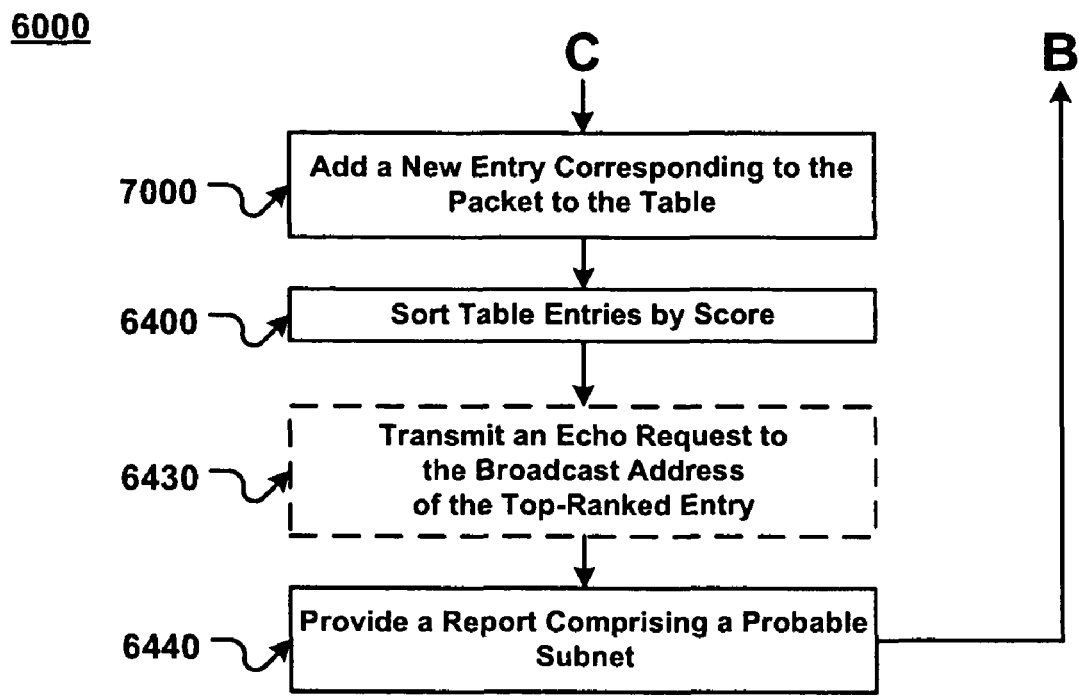

FIGS. 6A-6C show a flowchart of a process 6000 of determining a probable IP subnet on a network, in accordance with an embodiment of the present invention. Process 6000 may be implemented on the operating environments described above. Process 6000 is also well-suited to be stored as instructions on a computer readable medium. It is appreciated that not all steps of process 6000 are necessary for the general goal of process 6000 to be achieved. Moreover, it is appreciated that additional steps may also be included in process 6000 in accordance with alternative embodiments. The steps of process 6000, along with possible additional steps, may also be performed in a variety of different sequences as well.

Steps 6010, 6020 and 6025 of process 6000 are used in exemplary embodiments of process 6000 and as such are discussed below. Thus, the current discussion shall begin with step 6030. At step 6030, a packet is observed. The term "packet" is used because currently data packets are a common means for the transmission of Internet data, however it is appreciated that standards other than the data packet may develop to which embodiments of the present invention will be equally applicable. In one embodiment, a determination is made as to whether the packet is an ethernet broadcast packet (step 6040). If it is not, process 6000 proceeds to step 6060, where the next packet is observed. If the packet is an ethernet broadcast packet, process 6000 proceeds to step 6080, where determination is made as to whether the packet is an IPv4 packet. If it is not, process 6000 proceeds to step 6060, where the next packet is observed. If the packet is an IPv4 packet, process 6000 proceeds to step 6100, where the VLAN ID of the packet is obtained. It is appreciated that not all networks are broken down into VLANs. As such, step 6100 may be omitted in such situations. In one embodiment, the source port and IP address of the packet are obtained next (steps 6120 and 6140 respectively). At step 6160, a determination is made as to whether the IP address of the packet is a valid IP address. If it is not, process 6000 proceeds to step 6060, were the next packet is observed. If the IP address of the packet is a valid IP address, then the packet is suitable to be mined for its network information, and process 6000 accordingly proceeds to step 6180.

At step 6180, a table of possible networks corresponding to the VLAN and the source port of the packet is obtained. In one embodiment, the entries of the table correspond to potential network configurations based on observed packets. The entries may include, but are not limited to, respective network addresses, respective subnet masks, and respective scores. The respective score of an entry serves as a counter for the number of packets that have been observed that would fall under the network address of the entry. The higher an entry's score, the more likely it is that the entry represents the actual configuration of the network.

At step 6200, a determination is made as to whether the observed packet is the first packet observed for its respective VLAN (i.e., a table does not exist for the VLAN). If it is, a new table is created corresponding to the packet's VLAN (step 6220). Steps 6200 and 6220 both then proceed to step 6240 where the table corresponding to the packet's VLAN is loaded. At this point, the table is scanned for an entry that matches with the packet. For the purposes of this discussion, it shall be understood that the term "match" does not imply a "perfect match" between the packet and the entry, but rather that the IP address of the packet would fall under the network address of the given entry, as that phrase is used herein. Accordingly, starting with the first entry of the table (step 6260), a determination is made as to whether the IP address of the packet falls under the network address of the entry (step 6280). For example, the IP address 192.168.1.225 falls under the network address 192.168.1.0, with a subnet mask of 255.255.255.0. It is appreciated that this determination may be achieved in many ways. For example, in one embodiment, the IP address of the packet (e.g, 192.168.1.225) is masked with the subnet mask of the entry (e.g., 255.255.255.0) and then compared to the network address of the entry (e.g., 192.168.1.0). If a match is not found, process 6000 proceeds to step 6340. If a match is found, the respective score of the entry is incremented (step 6300) and a match flag is set to TRUE (step 6320). Process 6000 then proceeds to step 6340. At step 6340, the determination is made as to whether there are more entries in the table to be compared. If more entries remain, process 6000 proceeds to step 6360, where the next entry in the table is loaded and the process of scanning the entry for a match is repeated. If no more entries remain in the table, process 6000 proceeds to step 6380, where determination is made as to whether a match was found. In one embodiment, this is achieved by checking the state of the match flag. However, it is appreciated this may also be achieved in other ways. If a match was found, process 6000 then proceeds to step 6390, where the entries of the table of possible networks are then sorted by score. Process 6000 then returns to step 6060, where the next packet is observed. If a match was not found, a new entry needs to be made in the table. Accordingly, process 6000 then proceeds to step 7000, where a new entry corresponding to the packet is added to the table.

Figure 7:
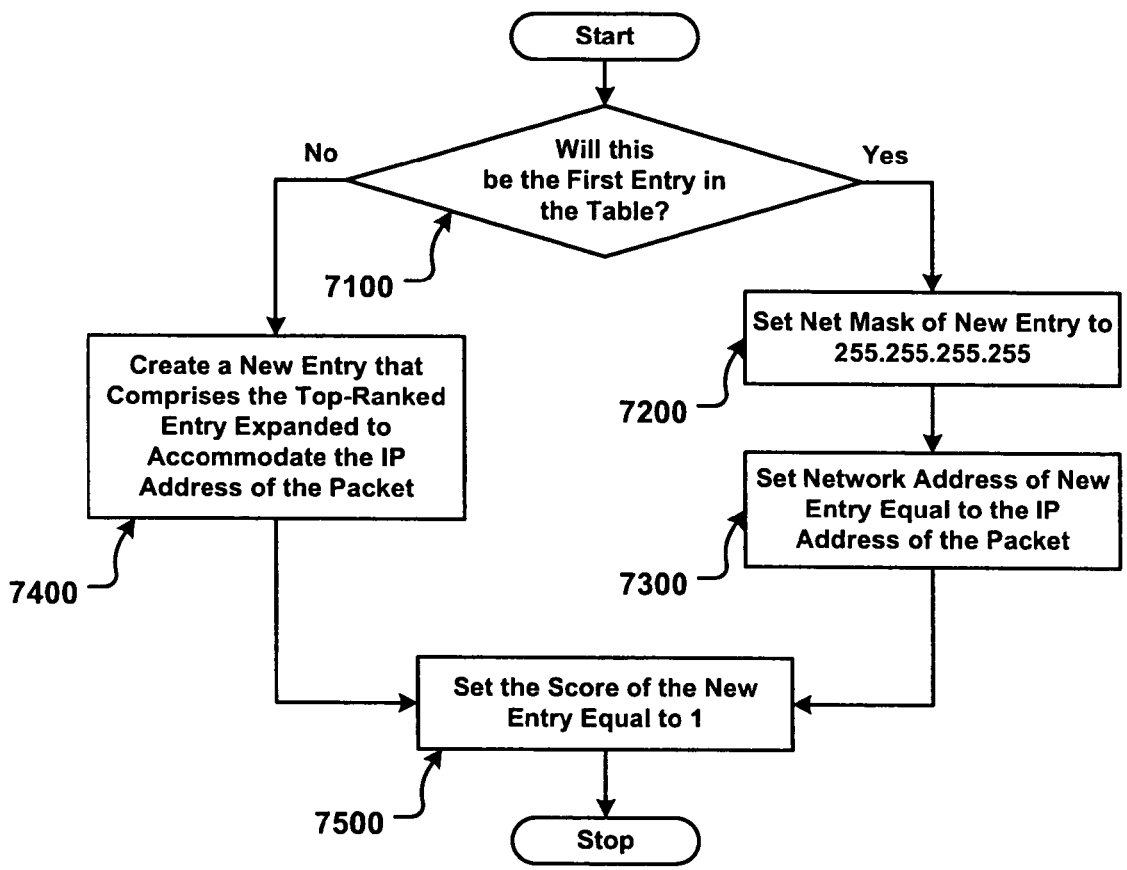
FIG. 7 shows a flowchart of a process for adding a new entry corresponding to a packet to a table of possible networks, in accordance with an embodiment of the present invention.

FIG. 7 shows a flowchart of a process 7000 for adding to a table of possible networks a new entry corresponding to a packet, in accordance with an embodiment of the present invention. Process 7000 begins at step 7100, where a determination is made as to whether the new entry will be the first entry in the table. If the new entry will be the first entry, it is desirable to make the new entry as narrow as possible. Accordingly, the respective subnet mask of the new entry is set to 255.255.255.255 or an equivalent (step 7200), and the respective network address of the new entry is set equal to the IP address of the packet (step 7300). On the other hand, if the new entry will not be the first entry in the table, it is desirable to expand the scope of the top-ranked entry in order to accommodate the IP address of the packet. Accordingly, at step 7400, a new entry is created that comprises the top-ranked entry expanded to accommodate the IP address of the packet. From both steps 7300 and 7400, process 7000 proceeds to step 7500, where the respective score of the new entry is set to 1.

Figure 8:
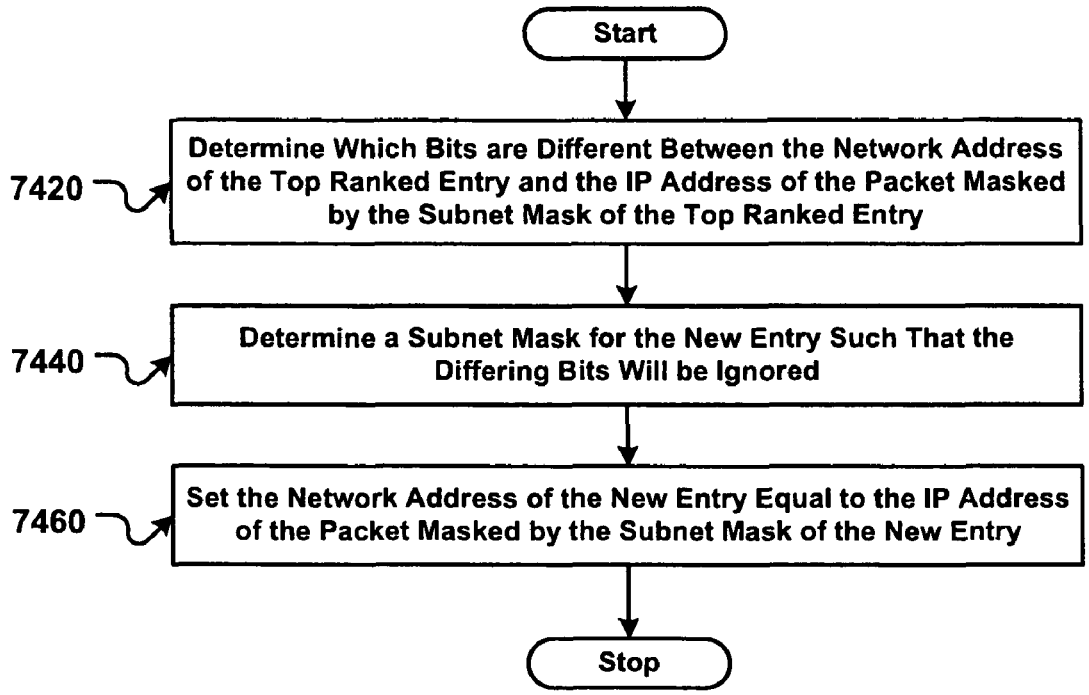
FIG. 8 shows a flowchart of process 7400 of creating a new entry in a table of possible networks that comprises the top-ranked entry expanded to accommodate the address of an observed packet, in accordance with an embodiment of the present invention.

FIG. 8 shows a flowchart of a process 7400 of creating a new entry in a table of possible networks that comprises the top-ranked entry expanded to accommodate the address of an observed packet, in accordance with an embodiment of the present invention. Process 7400 begins at step 7420 by determining which bits are different between the network address of the top-ranked entry and the IP address of the packet masked by the subnet mask of the top-ranked entry. In one embodiment, this determination is made by performing an XOR operation on the two values. For example, if the observed packet has an IP address of 192.168.2.20 (binary 11000000.10101000.00000010.00010100) and the top-ranked entry has a network address of 192.168.1.0 (binary 11000000.10101000.00000001.00000000) and a subnet mask of 255.255.255.0, the IP address of the packet masked by the subnet mask of the top-ranked entry would be 192.168.2.0 (binary 11000000.10101000.00000010.00000000). An XOR of the two values yields the result 0.0.3.0 (binary 00000000.00000000.00000011.00000000), indicating that bits 0 and 1 of the third octet are different.

At step 7440, a subnet mask is determined for the new entry such that the differing bits will be ignored. In one embodiment, this is achieved by performing an AND operation between the subnet mask of the top-ranked entry and the complement of the number representing the differing bits. Referring again to the above example, the subnet mask of the new entry would therefore become 255.255.252.0 (binary 11111111.11111111.11111100.00000000), which is effectively the subnet mask of the top-ranked entry widened by two bits.

At step 7460, the network address of the new entry is set equal to the IP address of the packet masked by the subnet mask of the new entry. Referring again to the above example, the network address of the new entry would therefore become 192.168.0.0.

With reference again to FIGS. 6A-6C, once step 7000 is completed, the entries of the table of possible networks are then sorted by score (step 6400). The resultant list is effectively a ranking of the possible networks observed thus far. At step 6440, a report comprising a probable subnet is generated. Since packets are continuously observed, it should be appreciated that step 6440 may occur at any point in process 6000. It is further appreciated that the report may take on several forms. For example, the form of the report may include, but is not limited to, a printed hard copy, a file stored on a storage device, or a graphical display on a display device. Furthermore, in one embodiment, the content of the report may consist solely of the top-ranked entry. In another embodiment, the report may contain several of the top-ranked entries.

The discussion up until now has only concerned passively observing network traffic. However, it is appreciated that active steps may be added to process 6000 to help expedite the converging. For example, in one embodiment, process 6000 includes checking for a DHCP server on the network and obtaining its configuration information (step 6010). In another embodiment, process 6000 includes soliciting hosts on the network (step 6020). In yet another embodiment, process 6000 includes querying other servers on the LAN segment that also implement process 6000 (step 6025). Thus, embodiments are capable of converging on the probable subnet of a network, even if the network is a relatively low-traffic network. Moreover, once sufficient data has been obtained, active steps may also be taken to verify that the top-ranked entry is the correct result. For example, in one embodiment, an echo request is transmitted to the broadcast address of the top-ranked entry (step 6430). Receiving several replies confirms that the top-ranked entry is likely the correct result, whereas receiving no replies indicates that the correct result has not yet been converged upon. It should be appreciated that although FIG. 6C depicts step 6430 as occurring just before step 6440, step 6430 may be executed elsewhere as well.

Thus, embodiments of the present invention provide a means for determining a probable IP subnet of a network. By providing a ranked set of results, embodiments are able to hedge against the possibility that one or more rogue or misconfigured hosts are connected to the network. When using embodiments of the present invention, if a computing device connected to a network experiences a network error, a system administrator would know with a degree of certainty whether or not the computing device is connected to the proper network, saving the system administrator the considerable time and aggravation of physically making the determination. Moreover, when embodiments implemented on virtualized environments detect that they are connected to an incorrect network, some embodiments allow the virtualized environments to connect themselves to new networks, to an extent troubleshooting themselves.

The previous description of the disclosed embodiments is provided to enable any person skilled in the art to make the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining a probable IP subnet of a network, the method comprising:
   maintaining a table of possible networks in a memory of a computer system, wherein entries of the table of possible networks comprise respective network addresses, respective subnet masks and respective scores;
   observing a packet received by the computer system;
   determining an IP address of the packet;
   comparing the IP address of the packet with the respective network addresses of the entries of the table of possible networks; and
   provided the IP address of the packet falls under the respective network address of a particular entry, adjusting the respective score of the particular entry;
   provided the IP address of the packet does not fall under the respective network addresses of the entries of the table of possible networks, creating a new entry in the table of possible networks corresponding to the IP address of the packet; and
   ranking the entries of the table of possible networks based on their respective score.

2. The method as recited in claim 1 wherein the comparing comprises:
   determining whether the results of bitwise AND operations between the IP address of the packet and the respective subnet masks of the entries is equal to the respective network addresses of the entries.

3. The method as recited in claim 1 wherein the network comprises multiple virtual LANs (VLANs), wherein further separate tables of possible networks are maintained for the VLANs.

4. The method as recited in claim 3 further comprising:
   determining the VLAN associated with the packet;
   determining whether the packet is the first packet observed for the VLAN associated with the packet; and
   provided the packet is the first packet observed for the VLAN associated with the packet, creating a new table corresponding to the VLAN associated with the packet.

5. The method as recited in claim 3 further comprising:
   determining the VLAN associated with the packet;
   wherein the IP address of the packet is compared with the network addresses of the table of possible networks corresponding to the VLAN associated with the packet.

6. The method as recited in claim 5 further comprising:
   determining a source port associated with the packet;
   wherein the IP address of the packet is compared with the network addresses of the table of possible networks corresponding to the VLAN and the source port associated with the packet.

7. The method as recited in claim 1 further comprising:
   provided the same score is held by multiple entries, assigning a higher rank to the entry having the narrowest subnet mask.

8. The method as recited in claim 1 further comprising:
   checking for a DHCP server on the network; and
   provided the DHCP server is present, obtaining network information from the DHCP server.

9. The method as recited in claim 1 further comprising:
   soliciting hosts on the network for packets.

10. The method as recited in claim 1 further comprising:
    determining whether the packet is an ethernet broadcast packet; and
    skipping over a non-ethernet broadcast packet.

11. The method as recited in claim 1 further comprising:
    determining whether the packet is an IPv4 packet; and
    skipping over a non-IPv4 packet.

12. The method as recited in claim 1 wherein the creating of the new entry comprises:
    determining whether the new entry is the first entry in the table of possible networks;
    provided the new entry is the first entry in the table of possible networks:
    setting the respective subnet mask of the new entry equal to 255.255.255.255; and
    setting the respective network address of the new entry equal to the IP address of the packet;
    provided the new entry is not the first entry in the table of possible networks, creating the new entry such that the new entry comprises the top-ranked entry of the table of possible networks expanded to accommodate the IP address of the packet; and
    setting the respective score of the new entry equal to 1.

13. The method as recited in claim 12 wherein the creating of the new entry such that the new entry comprises the top-ranked entry of the table of possible networks expanded to accommodate the IP address of the packet comprises:
    determining differing bits between the respective network address of the top-ranked entry of the table of possible networks and the IP address of the packet masked by the respective subnet mask of the top-ranked entry;
    determining a respective subnet mask for the new entry such that the differing bits will be ignored; and
    setting the respective network address of the new entry equal to the IP address of the packet masked by the respective subnet mask of the new entry.

14. A system for determining a probable IP subnet of a network, the system comprising:
    a network interface for sending and receiving a packet;
    a memory for storing a table of possible networks, wherein entries of the table of possible networks comprise respective network addresses, respective subnet masks, and respective scores; and
    a discovery port communicatively coupled with the network interface and the memory, the discovery port for observing the packet, for determining the IP address of the packet, for comparing the IP address of the packet with the respective network addresses of the entries of the table of possible networks, for adjusting the respective score of a particular entry provided the IP address of the packet falls under the respective network address of the particular entry, for creating a new entry in the table of possible networks corresponding to the IP address of the packet provided the IP address of the packet does not fall under the respective network addresses of the entries of the table of possible networks, and for ranking the entries of the table of possible networks based on their respective scores.

15. The system as recited in claim 14 wherein the network comprises multiple virtual LANs (VLANs) and wherein the memory stores separate tables of possible networks for the VLANs.

16. The system as recited in claim 14 wherein the discovery port is configurable to determine the VLAN associated with the packet and, if the packet is the first packet observed for the VLAN associated with the packet, create a new table corresponding to the VLAN associated with the packet.

17. The system as recited in claim 14 wherein the discovery port is configurable to determine the VLAN associated with the packet and compare the IP address of the packet with the network addresses of the table of possible networks corresponding to the VLAN associated with the packet.

18. The system as recited in claim 17 wherein the discovery port is configurable to determine a source port associated with the packet and compare the IP address of the packet with the network addresses of the table of possible networks corresponding to the VLAN and the source port associated with the packet.

19. The system as recited in claim 14 wherein the discovery port is configurable to check for DHCP server on the network via the network interface and obtain network information from the DHCP server via the network interface provided the DHCP server is present.

20. The system as recited in claim 14 wherein the discovery port is configurable to solicit hosts on the network for packets.

21. The system as recited in claim 14 wherein:
if the new entry will be the first entry in the table of possible networks, the respective subnet mask of the new entry comprises 255.255.255.255 and the respective network address of the new entry comprises the IP address of the packet;
if the new entry will not be the first entry in the table of possible networks, the new entry comprises the top-ranked entry of the table of possible networks expanded to accommodate the IP address of the packet; and
the respective score of the new entry comprises 1.

22. A non-transitory computer-readable storage medium having computer-readable program code stored thereon for causing a computer system to execute a method of determining a probable IP subnet of a network, the method comprising:
maintaining a table of possible networks in a memory of the computer system, wherein entries of the table of networks comprise respective network addresses, respective subnet masks and respective scores;
observing a packet received by the computer system;
determining an IP address of the packet;
comparing the IP address of the packet with the respective network addresses of the entries of the table of possible networks; and
provided the IP address of the packet does not fall under the respective network addresses of the entries of the table of possible networks, creating a new entry in the table of possible networks corresponding to the IP address of the packet; and
maintaining a table of possible networks, wherein entries of the table of networks comprise respective network addresses, respective subnet masks and respective scores;
provided the IP address of the packet falls under the respective network address of a particular entry, adjusting the respective score of the particular entry;
ranking the entries of the table of possible networks based on their respective scores.

23. The computer readable storage medium as recited in claim 22 wherein the comparing comprises:
determining whether the results of bitwise AND operations between the IP address of the packet and the respective subnet masks of the entries is equal to the respective network addresses of the entries.

24. The computer readable storage medium as recited in claim 22 wherein the network comprises multiple virtual LANs (VLANs), wherein further separate tables of possible networks are maintained for the VLANs.

25. The computer readable storage medium as recited in claim 24 wherein the method further comprises:
determining the VLAN associated with the packet;
determining whether the packet is the first packet observed for the VLAN associated with the packet; and
provided the packet is the first packet observed for the VLAN associated with the packet, creating a new table corresponding to the VLAN associated with the packet.

26. The computer readable storage medium as recited in claim 24 wherein the method further comprises:
determining the VLAN associated with the packet;
wherein the IP address of the packet is compared with the network addresses of the table of possible networks corresponding to the VLAN associated with the packet.

27. The computer readable storage medium as recited in claim 24 wherein the method further comprises:
determining a source port associated with the packet;
wherein the network address of the packet is compared with the network addresses of the table of possible networks corresponding to the VLAN and the source port associated with the packet.

28. The computer readable storage medium as recited in claim 22 wherein the method further comprises:
provided the same score is held by multiple entries, assigning a higher rank to the entry having the narrowest subnet mask.

29. The computer readable storage medium as recited in claim 22 wherein the method further comprises:
checking for a DHCP server on the network; and
obtaining network information from the DHCP server.

30. The computer readable storage medium as recited in claim 22 wherein the method further comprises:
soliciting hosts on the network for packets.

31. The computer readable storage medium as recited in claim 22 wherein the method further comprises:
determining whether the packet is an ethernet broadcast packet; and
skipping over a non-ethernet broadcast packet.

32. The computer readable storage medium as recited in claim 22 wherein the method further comprises:
determining whether the packet is an IPv4 packet; and
skipping over a non-IPv4 packet.

33. The computer readable storage medium as recited in claim 22 wherein the creating of the new entry comprises:
determining whether the new entry will be the first entry in the table of possible networks;
provided the new entry will be the first entry in the table of possible networks:
setting the respective subnet mask of the new entry equal to 255.255.255.255; and
setting the respective network address of the new entry equal to the IP address of the packet;
provided the new entry will not be the first entry in the table of possible networks, creating the new entry such that the new entry comprises the top-ranked entry of the table of possible networks expanded to accommodate the IP address of the packet; and setting the respective score of the new entry equal to 1.

34. The computer readable storage medium as recited in claim 33 wherein the creating of the new entry such that the new entry comprises the top-ranked entry of the table of possible networks expanded to accommodate the IP address of the packet comprises:

determining differing bits between the respective network address of the top-ranked entry of the table of possible networks and the IP address of the packet masked by the respective subnet mask of the top-ranked entry;

determining a respective subnet mask for the new entry such that the differing bits will be ignored; and setting the respective network address of the new entry equal to the IP address of the packet masked by the respective subnet mask of the new entry.

35. A computer system for determining a probable IP subnet of a first network, the system comprising:

a hardware layer comprising:

a first network interface card (NIC) coupled with the first network; and a memory;

a Virtual Machine layer comprising:

a virtual NIC for sending and receiving a packet;

a virtual memory for storing a table of possible networks, wherein entries of the table of possible networks comprise respective network addresses, respective subnet masks, and respective scores; and a discovery module communicatively coupled with the virtual NIC and the virtual memory, the discovery module for observing the packet, for determining the IP address of the packet, for comparing the IP address of the packet with the respective network addresses of the entries of the table of possible networks, for adjusting the respective score of a particular entry provided the IP address of the packet falls under the respective network address of the particular entry, for creating a new entry in the table of possible networks corresponding to the IP address of the packet provided the IP address of the packet does not fall under the respective network addresses of the entries of the table of possible networks, and for ranking the entries of the table of possible networks based on their respective scores; and a virtualization layer for interfacing between the hardware layer and the Virtual Machine layer.

36. The computer system as recited in claim 35 wherein the virtualization layer comprises a first virtual switch communicatively coupled with the virtual NIC and the first NIC, the first virtual switch for switching network traffic between the virtual NIC and the NIC.

37. The computer system as recited in claim 36 wherein the hardware layer comprises a second NIC coupled with a second network, the virtualization layer comprises a second virtual switch communicatively coupled with the second NIC, and the Virtual Machine comprises a network assignment, wherein if the top-ranked entry in the table of possible networks does not correspond to the network assignment, the virtual machine is configurable to cause the virtual NIC to become communicatively coupled with the second virtual switch.

38. The computer system as recited in claim 35 wherein the first network comprises multiple virtual LANs (VLANs) and wherein the virtual memory stores separate tables of possible networks for the VLANs.

39. The computer system as recited in claim 38 wherein the discovery module is configurable to determine the VLAN associated with the packet and whether the packet is the first packet observed for the VLAN associated with the packet, and, provided the packet is the first packet observed for the VLAN associated with the packet, create a new table corresponding to the VLAN associated with the packet.

40. The computer system as recited in claim 38 wherein the discovery module is configurable to determine the VLAN associated with the packet and compare the IP address of the packet with the network addresses of the table of possible networks corresponding to the VLAN associated with the packet.

41. The computer system as recited in claim 40 wherein the discovery module is configurable to determine a source port associated with the packet and compare the IP address of the packet with the network addresses of the table of possible networks corresponding to the VLAN and the source port associated with the packet.

42. The computer system as recited in claim 35 wherein the discovery module is configurable to check for a DHCP server on the first network via the virtual NIC and obtain network information from the DHCP server via the network interface provided the DHCP server is present.

43. The computer system as recited in claim 35 wherein the discovery module is configurable to solicit hosts on the first network for packets.

44. The computer system as recited in claim 35 wherein:

if the new entry is the first entry in the table of possible networks, the respective subnet mask of the new entry comprises 255.255.255.255 and the respective network address of the new entry comprises the IP address of the packet;

if the new entry is be the first entry in the table of possible networks, the new entry comprises the top-ranked entry of the table of possible networks expanded to accommodate the IP address of the packet; and the respective score of the new entry comprises 1.

\* \* \* \* \*